Jan. 28, 1930.  H. W. ROELING ET AL  1,745,272
ELECTRIC METER
Filed July 21, 1927   2 Sheets-Sheet 2

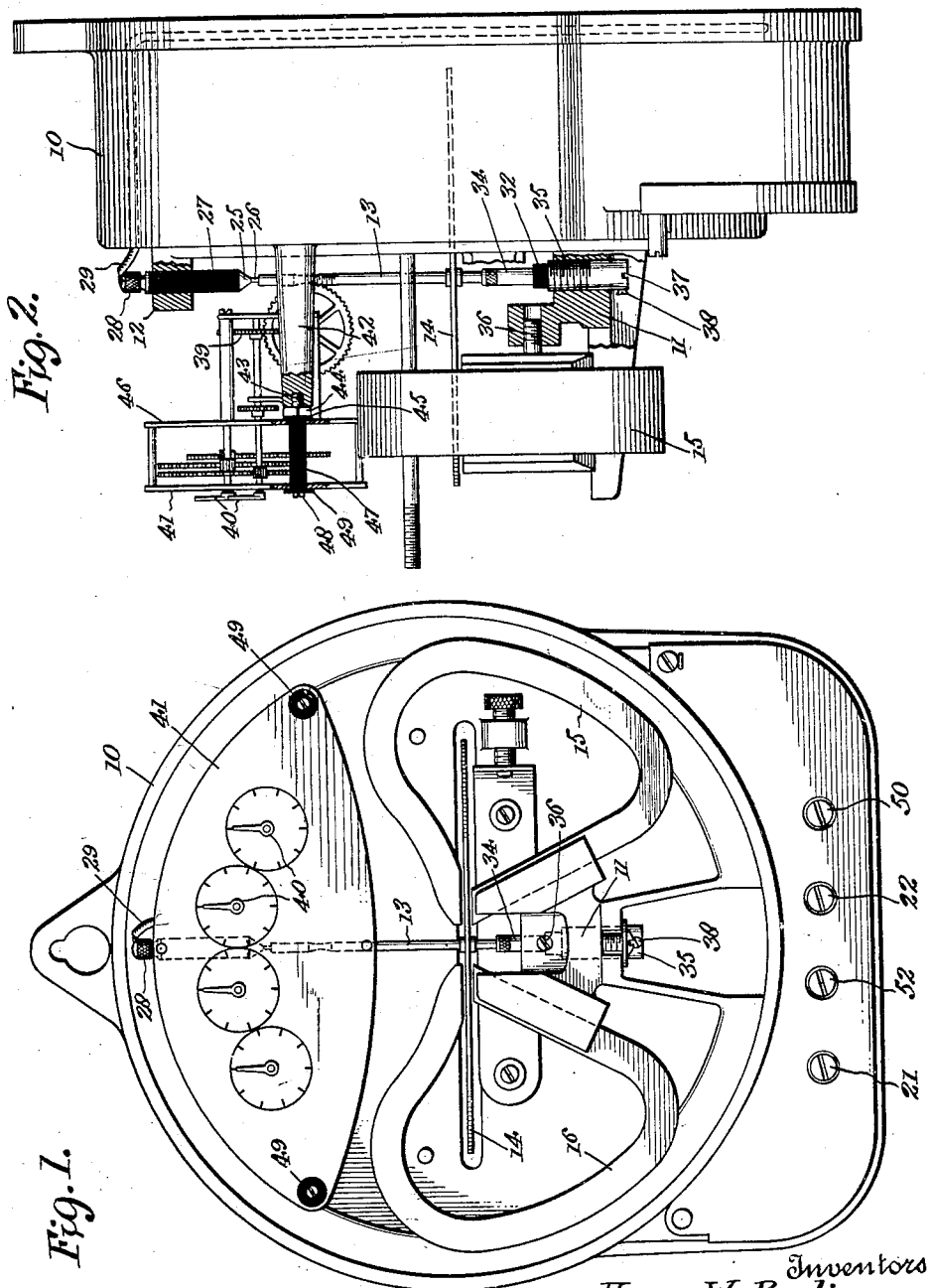

Inventors.
Henry W. Roeling
Bernard F. Austin
and John G. Bauer
by Wilkinson & Giusta
Attorneys.

Patented Jan. 28, 1930

1,745,272

UNITED STATES PATENT OFFICE

HENRY WILLIAM ROELING, BERNARD FRANK AUSTIN, AND JOHN GEORGE BAUER, OF NEW ORLEANS, LOUISIANA

ELECTRIC METER

Application filed July 21, 1927. Serial No. 207,435.

The present invention relates to electric meters, more particularly to a protective means for preventing fraudulent interference with the operation of the meter.

The primary object of the invention is to provide an electric meter with a dial and a disk armature which are connected in one side of the circuit which is of a polarity different from the supporting frame of the meter connected in the other side of the circuit, so that when a foreign body of metal is introduced into the meter against the movable parts, a short circuit will be formed.

Another object of the invention is to provide the ordinary electric meter, without material change in the construction, with upper and lower jewels and with a dial mounting which are insulated from the frame or body part of the meter, and which are so connected in the main circuit as to be of opposite polarity to that of the frame and corresponding field parts.

The invention has for an object to provide upper and lower jewels of improved construction adapted for use with the ordinary armature disk shaft without modification to the latter and wherein the jewels may be substitued for those ordinarily employed but which in their construction are composed of inner and outer parts insulated one from the other.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a face view of an electric meter of the conventional form equipped with the improvements of the present invention;

Figure 2 is a side elevation of the same with parts in section showing the mounting of the insulating parts;

Figure 3:
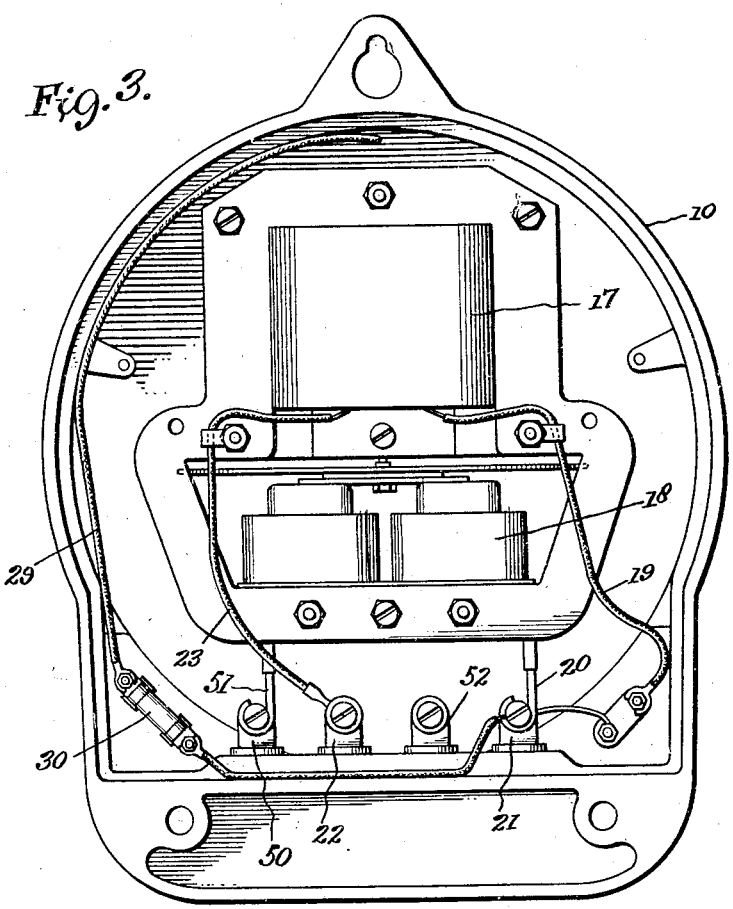
Figure 3 is a rear elevation of the meter, showing the improved wiring connections.

Referring to the drawings, 10 designates the frame or housing of an electric meter of conventional form, and such as is set forth and described in U. S. Letters Patent No. 1,180,795, granted W. H. Pratt, April 25, 1916. The frame 10 is provided within its lower part with a lower support 11 and in its upper part with an upper support 12, the supports being disposed in vertical axial alignment and arranged to carry a shaft 13 upon which is mounted an armature disk 14. The disk 14 operates between permanent magnets 15 and 16 and between voltage and current coil magnets 17 and 18, in the usual manner. The magnets 17 and 18 are connected respectively by leads 19 and 20 to a terminal post 21 of one side of the main circuit while a terminal post 22 of the opposite side of the main circuit is connected by a lead 23 with the opposite end of the upper coil 17.

The meter casing 10 is also provided therein with a terminal post 50 connected by a lead 51 to the magnets 15 and 16 and with a ground post 52, the posts 22 and 50 comprising the lead-in posts, while the posts 21 and 52 comprise the leading-out posts with respect to the meter.

Figure 4:
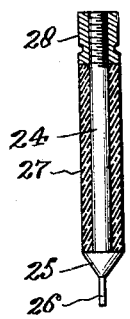
Figure 4 is a detail longitudinal section, enlarged, taken through the upper jewel.
Figure 5:
Figure 5 is a similar view taken through the lower jewel.

The upper support 12 is provided, according to this invention, with an upper jewel, best seen in Figure 4, which comprises a central post 24 having a conical head 25 upon its lower end terminating in a bearing pin or jewel 26 adapted to seat in the upper end of the shaft 13 for supporting the latter. A barrel 27 of insulating material is fitted about the post 24 and bears at one end against the head 25, while its other end engages a threaded nut 28 fitted to the upper end of the post 24. The barrel 27 is frictionally held in the upper support 12 as shown in Figure 2, and the nut 28, and upper end of the post 24 are placed in electrical connection with the terminal 21 at one side of the circuit by a lead 29 suitably disposed in the casing 10. The lead 29 may have a fuse 30 therein for the protection of the meter. Of course, the wiring may be varied and the post 24 may be placed in either side of the main circuit, the requirement only being that the post 24 and the parts connected thereto be in the side of the circuit opposite to that of the frame 10 and the parts electrically connected thereto. The lower support 11 carries a lower jewel which is best seen in Figure 5.

The lower jewel comprises a central post or pin 31 which is mounted in a barrel 32 of insulating material. The post 31 extends upwardly from the barrel 32 and is provided with an exteriorly threaded bearing head 33 on its upper end in which is seated the lower end of the armature shaft 13. A protecting sleeve 34, internally threaded at its lower end, is mounted upon the head 33 and is turned down over the head into contact with the insulating barrel 32. The sleeve 34 extends upwardly about the head 33 and is adapted to envelop the lower end of the armature shaft 13. A metallic bushing 35 is fitted about the barrel 32 and is externally threaded and adjustably mounted in the lower support 11, a set screw 38 carried by the bushing 35 binds against the barrel 32 to hold it in adjusted position. The lower end of the sleeve 35 may be kerfed as at 37 to receive the bit of a screw driver or the like for adjusting the lower jewel in the support 11. By releasing the set screw 38 the barrel 32 with the inner parts of the lower jewel may be removed and adjusted.

Figure 6:
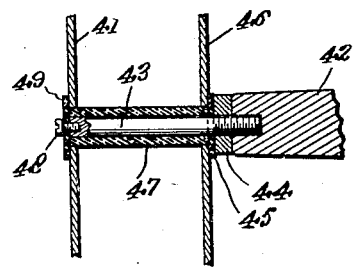
Figure 6 is a fragmentary enlarged section taken through one of the dial mounting posts, showing the manner of insulating the same from the frame.

The shaft 13 is connected by a train of gearing 39 with indicators 40 which traverse an indicating dial 41. The dial 41 is mounted on posts 42 which project from the front of the frame 10. In order to insulate the dial 41 and the parts which are carried thereby from the frame posts 42, the present invention provides insulating posts for connecting the dial 41 to the frame post 42. One of the insulating posts is shown in position in Figure 6. The insulating post comprises a core rod 43 threaded at one end to receive a lock nut 44 adapted to bind against the frame post 42, the threaded extremity of the rod 42 engaging in the post in the usual manner An insulating washer 45 is fitted against the nut 44 and adapted to bear against the rear dial plate 46. A barrel 47 of insulating material is carried upon the core rod 43 throughout substantially its length and projects through the openings in the front and rear dial plates 41 and 46 to insulate the same from the core rod 43. A set screw 48 is threaded into the outer end of the core rod 43 and carries a washer 49 of insulating material adapted to engage the outer face of the outer dial plate 41 to hold the same upon the insulating post and upon the outer end of the insulating barrel 47.

In operation, the meter armature 14 revolves in the usual manner between the magnets as above mentioned.

The armature 14 with its shaft 13, train of gears 39 and the dial plates 41 and 46 are of a polarity which is different from that of the frame 10 and the supports 11 and 12. This is effected by connecting the lead 29 from the inner part or core of the upper jewel to one of the terminals, such as 22 which is not in electrical contact with the frame 10 and the parts constituting the magnetic field.

Thus, should a wire or other metallic element be introduced into the meter in an endeavor to check the operation of the armature disk 14, the metallic member would engage the armature 14 of one polarity and also engage the frame part of an opposite polarity and cause a short circuit exclusive of the meter. This will protect the meter and at the same time shut off all current from the service leads. In order to protect the meter itself, the fuse 30 may be used but its use would not be essential except in case where the line fuse was either bridged or failed to give way.

It will be obvious that many changes in the construction, combination and arrangement of parts could be made, which could be used without departing from the spirit of our invention, and we do not mean to limit the invention to such details, except as particularly pointed out in the claims.

Having thus described our invention, what we claim and desire to secure by Letters Patent of the United States is:—

1. In an electric meter, a stationry structure connected with one side of the main circuit, a movable structure in the stationary structure and having a shaft, a pair of jewels carried by the stationary structure receiving said shaft, each of said jewels comprising a central post carrying a bearing member adapted for direct engagement with the shaft to support it, and an insulating barrel surrounding said shaft for spacing the same from the stationary structure, one of said jewels having means for connection with the other side of the main circuit, whereby the stationary and movable structure may be of opposite polarities.

2. An electric meter, comprising stationary ground potential and movable line potential structures, and means for insulating the movable structure from the stationary structure, whereby bridging of and displaceable contact between the stationary and movable structures short circuits the meter and renders the same inoperative.

HENRY WILLIAM ROELING.
BERNARD FRANK AUSTIN.
JOHN GEORGE BAUER.